United States Patent [19]

Erdley

[11] Patent Number: 5,531,115

[45] Date of Patent: Jul. 2, 1996

[54] SELF-CALIBRATING THREE AXIS ANGULAR RATE SENSOR

[76] Inventor: Harold F. Erdley, 1210 El Medio Ave., Pacific Palisades, Calif. 90272-2423

[21] Appl. No.: 496,816

[22] Filed: Jun. 29, 1995

[51] Int. Cl.$^6$ .............................. G01P 3/48; G01P 21/00
[52] U.S. Cl. .................. 73/504.02; 73/1 D; 364/571.04; 364/571.05; 364/564
[58] Field of Search ............................... 73/504.02, 1 D, 73/1 E, 2; 364/564, 571.01–571.08

[56] References Cited

U.S. PATENT DOCUMENTS

| | | | |
|---|---|---|---|
| 5,045,745 | 9/1991 | Umemoto et al. | 73/1 D X |
| 5,056,366 | 10/1991 | Fersht et al. | 73/505 |
| 5,065,627 | 11/1991 | Stewart et al. | 73/505 |
| 5,251,483 | 10/1993 | Soderkvist | 73/505 |
| 5,283,754 | 2/1994 | Stieler et al. | 73/1 E X |
| 5,293,779 | 3/1994 | Nakamura et al. | 73/1 D X |
| 5,331,578 | 7/1994 | Stieler | 73/1 E X |
| 5,355,730 | 10/1994 | Koizumi | 73/504.02 X |
| 5,359,893 | 11/1994 | Dunn | 73/505 |
| 5,388,458 | 2/1995 | Weinberg et al. | 73/505 |
| 5,426,970 | 6/1995 | Florida et al. | 73/1 D |

OTHER PUBLICATIONS

Beranek, Leo L., *Acoustics*, McGraw–Hill Book Co., Inc., 1954, pp. 70–74.
Gelb, Arthur, *Applied Optimal Estimation*, The M.I.T. Press, Massachusetts Institute of Technology, 1974, pp. 67–70.

*Primary Examiner*—Thomas P. Noland

[57] ABSTRACT

A self-calibrating three axis angular rate sensor in which a single proof mass is supported from an outer case by a set of spring elements having substantially equal mechanical translational spring rates in all directions. Each axis is electromechanically coupled such that each of three sets of electrical terminals acts as a combined electrical driving and electrical detection means with respect to motion of the proof mass. The proof mass motion in combination with a general three axis angular rate input results in coriolis forces acting upon the proof mass. When the electrical terminals are driven with a multiplicity of additive sinusoidal time function electrical voltages, measurements of these voltages and resulting electrical currents comprise observable data for a computed extraction of three axis angular rate inputs. In addition, the computed extraction provides an accurate measure of variations of electrical parameters of the electromechanical coupling, of variations of mechanical translational spring rates and damping parameters, and of variations of electromechanical coupling coefficients of the set of spring elements. The computed extraction results in outputs of three axis angular rate which are substantially independent of these electrical and mechanical parameter variations. The measurements of electrical and mechanical parameter variations are compared with their respective nominal values in order to establish an overall data validity check.

10 Claims, 12 Drawing Sheets

$$KU = \begin{bmatrix} K11 & K12 & K13 \\ K12 & K22 & K23 \\ K13 & K23 & K33 \end{bmatrix} \begin{bmatrix} X \\ Y \\ Z \end{bmatrix}$$

Direct Axis Spring Rate Parameters: K11, K22, K33

Cross Axis Spring Rate Parameters: K12, K13, K23

Force Components of Above Expression:

X-Axis Component of Force = K11*X+K12*Y+K13*Z
Y-Axis Component of Force = K12*X+K22*Y+K23*Z
Z-Axis Component of Force = K13*X+K23*Y+K33*Z

FIGURE 9

SELF-CALIBRATING THREE AXIS ANGULAR RATE SENSOR

BACKGROUND—FIELD OF INVENTION

This invention relates to a vibratory, coriolis force type angular rate sensor, specifically to a self-calibrating, three axis implementation thereof.

BACKGROUND—DESCRIPTION OF PRIOR ART

Vibrating mass coriolis force type angular rate sensors or gyros have inherent advantages in terms of simplicity of design, low cost, and long life. The use of coriolis force in vibratory gyroscopes is well known. For example, Soderkvist, U.S. Pat. No. 5,251,483 relates to a piezoelectrically driven tuning fork type coriolis force type gyro. The accuracy of this type of sensor, however, has been limited by variations in its physical and electrical parameters with time, temperature, and usage. These variations result in changes in the sensor scale factor, the sensor angular rate bias offset, and the misalignment angles of the axis about which the angular rate is to be measured. Moreover, because these sensors measure only a single axis of input angular rate, three sensors are generally required for any systems that must measure angular rate along all three physical axes. Means for angularly orienting the input angular rate sensing axes of three sensors with respect to one another with sufficient accuracy must also be provided.

Coriolis force type angular rate sensors typically require one transducer or one set of transducers to perform the drive motion function and a separate sensor or set of sensors to detect the coriolis force generated motion resulting from an input angular rate. Even the application of feedback control methods, as disclosed in Fersht, et al., U.S. Pat. No. 5,056,366, to null the coriolis force induced motions of the driven element, do not eliminate scale factor errors due to variations in piezoelectric coupling. These methods also do not eliminate angular rate bias errors due to variations in the combination of mechanical coupling and mechanical damping. In general, any mechanical coupling between driven elements and detection elements other than desired coriolis force coupling results in sensor errors. Since this undesired coupling may change with time and temperature, these errors have limited the accuracy attainable from coriolis force vibratory angular rate sensors.

Most coriolis force type angular rate sensors are mechanized in a tuning fork, or similar, arrangement, in which pairs of inertial elements are driven in opposite time phase with respect to one another. This is to establish a high mechanical "Q," i.e., to minimize mechanical energy losses of the vibrating inertial elements through the supporting base structure. This is critically important for tuning fork type angular rate sensors because any combination of these energy losses and unwanted mechanical coupling between the driven inertial elements and the detection elements results in the detection of a nonexistent angular rate.

One form of tuning fork type angular rate sensor, for example, Weinberg, et al, U.S. Pat. No. 5,388,458, employs a quartz resonant oscillator. This methodology forces the excitation frequency to constantly be near the natural frequency of the driven tines of the tuning fork sensor. While this objective is achieved, there result significant limitations. These include a need for amplitude control of the feedback oscillator as well as the utilization of only a single frequency per axis. This significantly limits the ability to separate angular rate from variations in sensor electrical and mechanical parameters.

Stewart, et al, U.S. Pat. No. 5,065,627, discloses an inertial measurement unit with three axes of angular rate as well as three axes of acceleration outputs. The methodology described requires a multiplicity of mechanical parts, including two sets of three separate pendulous accelerometers. Each said set of accelerometers must be mounted on a separate driven oscillatory rotary element. These driven mounting structures must include highly accurate angular orientation provisions, and must provide for balancing with extreme precision centrifugal forces acting upon the accelerometer pendulosities with respect to the two sets of accelerometers. There are no provisions here for self-calibration.

Dunn, U.S. Pat. No. 5,359,893, employs a micromachined structure to implement a two axis vibratory rotation gyro. By adding an additional identical gyro mounted orthogonal to the first, three axes of output angular rate are obtained. No provisions are made, however, for self-calibration. There is, therefore, a need for a coriolis force vibratory gyro which maintains the inherent advantages of mechanical simplicity and low cost, but which overcomes the errors due to variations of the critical mechanical and electrical parameters with time and temperature. There is also a need for an intrinsically three axis single proof mass or inertia sensor which continuously maintains mutual axis orthogonality self-calibration.

OBJECTS AND ADVANTAGES

Accordingly, several objects and advantages of this invention include significant improvement in accuracy over previous vibratory type angular rate sensors. This is accomplished by incorporation of means to continuously estimate substantially all critical mechanical and electrical parameters of a coriolis force type angular rate sensor. Three mutually orthogonal axes of angular rate information from a single mechanical sensor unit are provided, and said measures of angular rate remain substantially independent of variations in critical mechanical and electrical parameters.

The mechanical sensor unit of this invention requires only a single proof mass. The high mechanical "Q" requirement of conventional vibrating angular rate sensors with its implied requirement for a tuning fork type mechanical configuration is minimized here. This is done by the continuous estimation process of said critical mechanical parameters. In this way, although significant input-to-output coupling may be present, the desired coriolis force effects are separable from the mechanical damping and angular cross coupling force effects.

This invention utilizes one set of electromechanical transducers per axis as both a means of excitation and a means of detection of vibration of a proof mass this obviates the need for separate excitation and detection transducers.

This invention requires only conventional electromechanical technology, such as the use of piezoelectric quartz or piezoceramics transducer elements. These transducers are mechanically connected to a single common proof mass element as well as to a common outer case along all three axes. The digitally computed outputs include three mutually orthogonal angular rates as well as mechanical parameter outputs of all direct axis and cross axis mechanical translational spring rates, all direct axis and cross axis mechanical damping parameters, and all direct axis and cross axis electromechanical coupling coefficients, such as piezoelectric coupling coefficients. The electrical parameters in this context are the electrical capacity and resistance values of piezoelectric beams.

Another advantages of this invention is the integrated and complementary use of mechanical sensor and microprocessor technologies. This enables an accurate and continuous modeling of a relatively simple electromechanical three axis sensor, thus providing the needed calibration for greatly improved accuracy over techniques used heretofore. This calibration also incorporates the automatic continuous maintenance of sensor axis mutual orthogonality.

In addition, this invention provides, as a direct output from this sensor parameter and coefficient evaluation process, a continuous measure of the validity of the output data, as any out of tolerance measurements indicate a risk of an impending sensor malfunction.

Still further objects and advantages will become apparent from a consideration of the ensuing description and accompanying drawings.

BRIEF DESCRIPTION OF THE DRAWINGS

FIG. 9 is a matrix expression of the three axis spring forces acting upon the proof mass.

Figure 1:
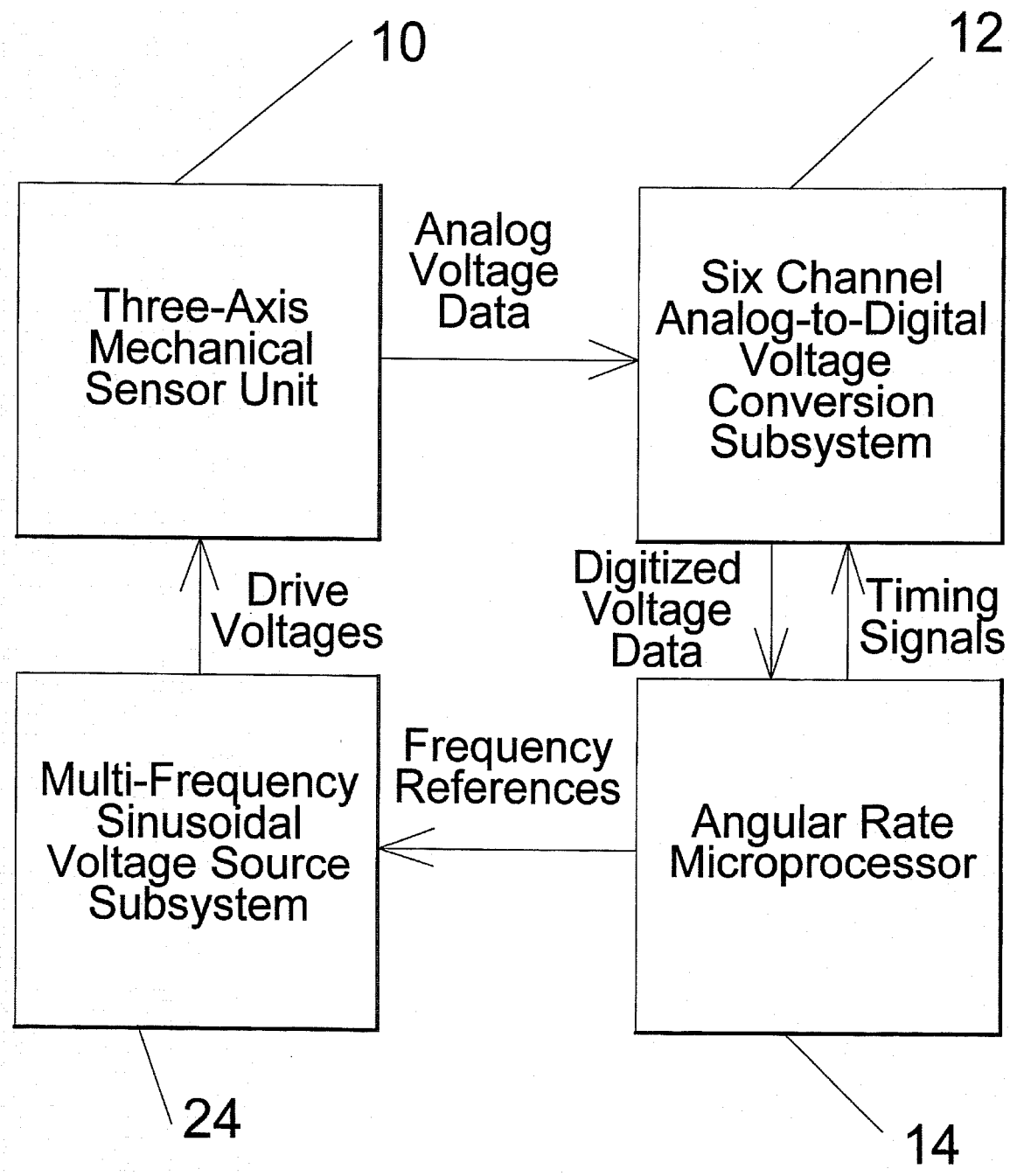
FIG. 1 is a block diagram of a self-calibrating three axis angular rate sensor.

REFERENCE NUMERALS 10 three axis mechanical sensor unit
12 six-channel analog-to-digital voltage conversion subsystem
14 angular rate microprocessor
16 outer case
18 proof mass
20 beam
20A beam
20B beam
20C beam
20D beam
20E beam
22 clamping block
22A clamping block
22B clamping block
22C clamping block
22D clamping block
22E clamping block
22F clamping block
22G clamping block
22H clamping block
22I clamping block
22J clamping block
22K clamping block
22 multi-frequency sinusoidal voltage source subsystem
26 electrode
26A electrode
26B electrode
26C electrode
26D electrode
26E electrode
26F electrode
26G electrode
26H electrode
26I electrode
26J electrode
26K electrode
28 wire lead
28A wire lead
28B wire lead
28C wire lead
28D wire lead
28E wire lead
28F wire lead
28G wire lead
28H wire lead
28I wire lead
28J wire lead
28K wire lead
30 electrical feed-through element
30A electrical feed-through element
30B electrical feed-through element
30C electrical feed-through element
30D electrical feed-through element
30E electrical feed-through element
30F electrical feed-through element
30G electrical feed-through element
30H electrical feed-through element
30I electrical feed-through element
30J electrical feed-through element
30K electrical feed-through element

SUMMARY

A self-calibrating three axis angular rate sensor in which a single proof mass is supported from an outer case by a set of spring elements. These spring elements provide mechanical support of the proof mass with substantially equal mechanical translational spring rates in all directions. The set of spring elements is electromechanically driven at or near the mechanical suspension system natural translational frequency along all three axes by electrical excitation. This excitation is made up of a multiplicity of additive separate frequency sinusoidal signals with respect to time at substantially constant driving frequencies. The resulting three axis proof mass motion results in coriolis forces upon the proof mass in resonse to three axis angular rate inputs. The electrical voltages and currents are measured and computed at each frequency, and the resulting values used to compute the three input angular rates as well as the critical electrical parameters, mechanical parameters, and electromechanical coupling coefficients. Said computed parameters and coefficients are compared with their nominal values in order to establish an overall data validity check.

Description

A self-calibrating three axis angular rate sensor is made up of a three axis mechanical sensor unit 10, a six-channel analog-to-digital voltage conversion subsystem 12, a multi-frequency sinusoidal voltage source subsystem 24, and an angular rate microprocessor 14, as shown in FIG. 1.

Figure 2:
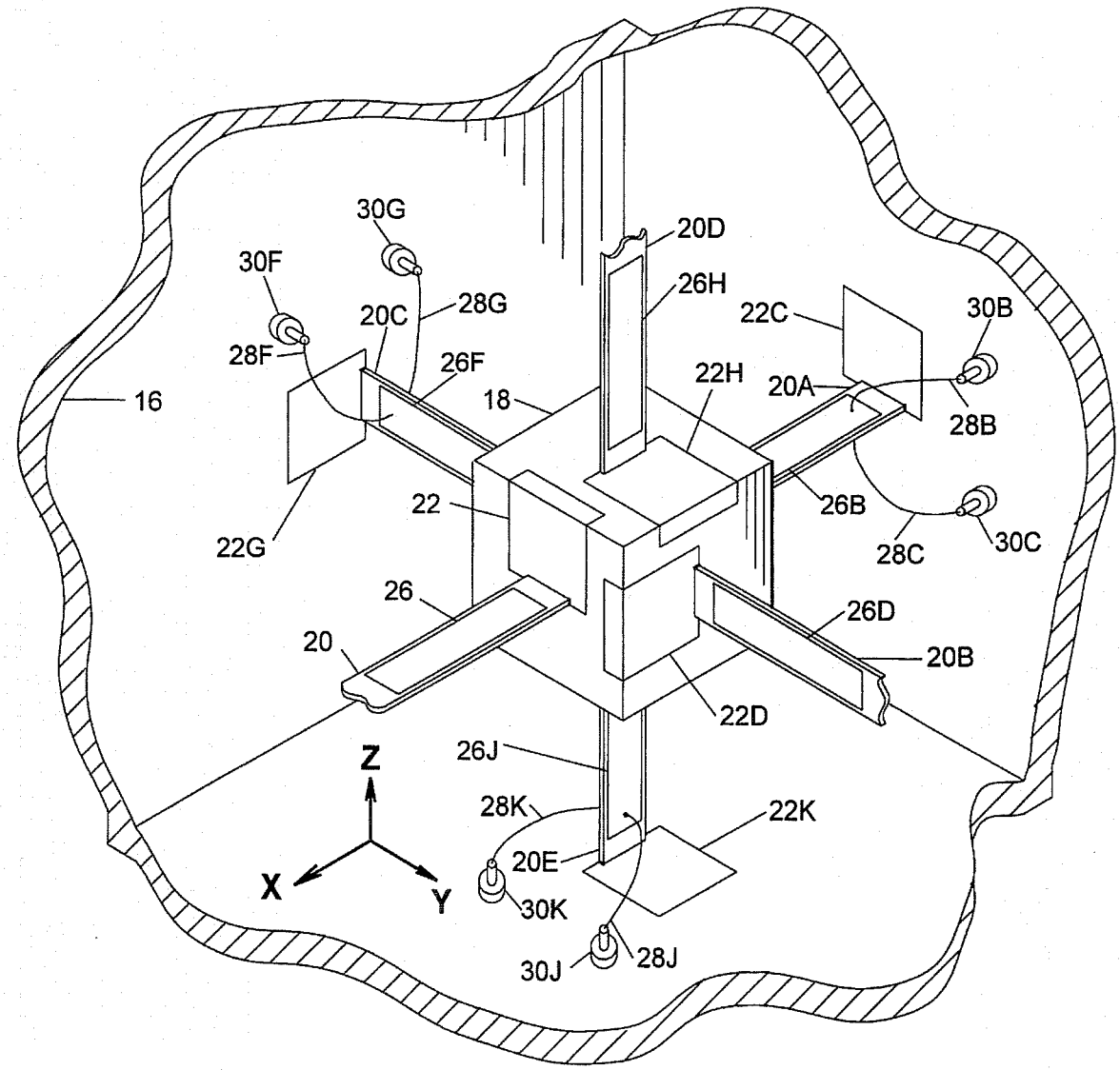
FIG. 2 is an isometric cutaway view of the mechanical sensor unit of this invention.
Figure 3:
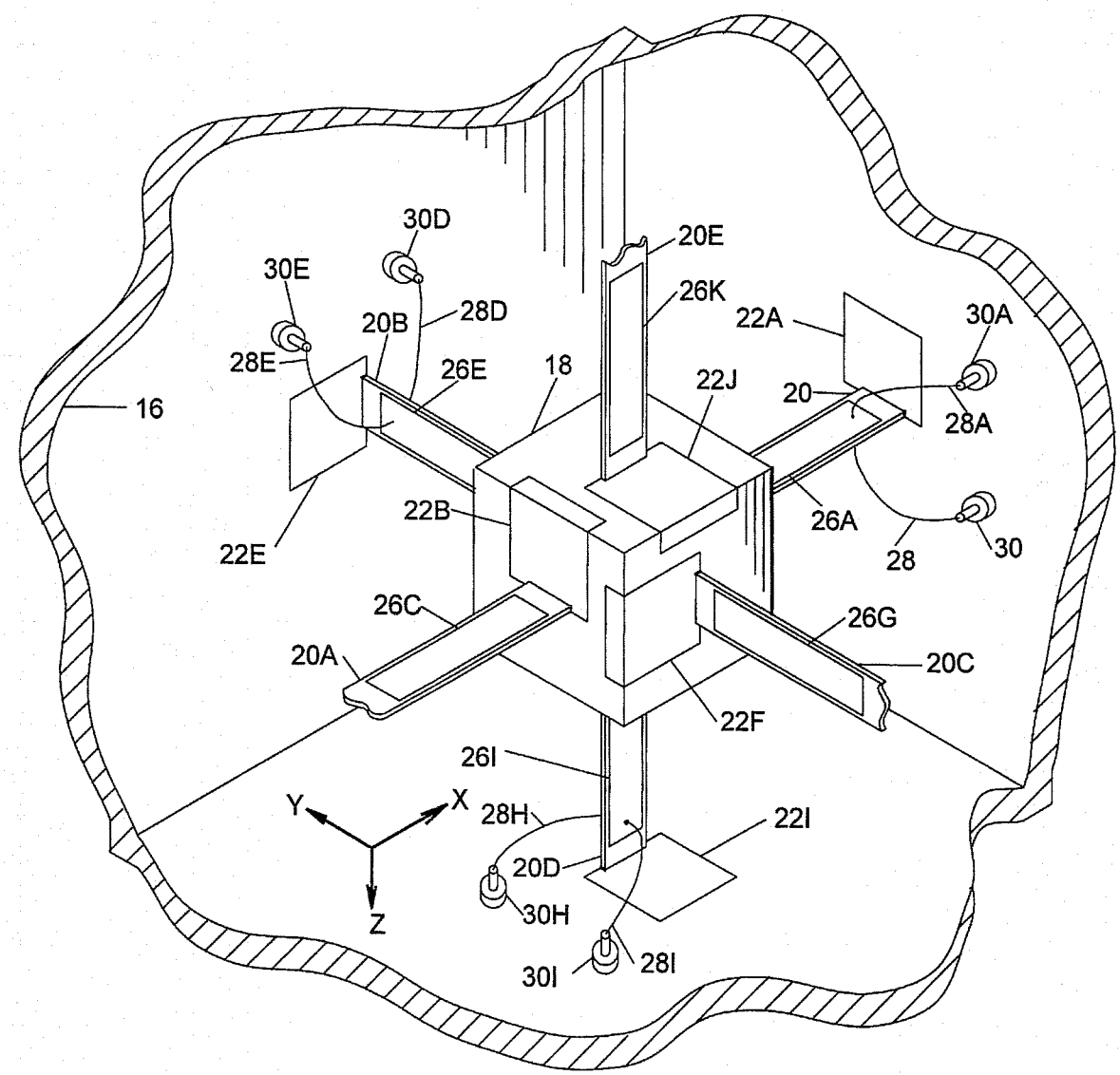
FIG. 3 is an isometric cutaway diametrically opposing view to that of FIG. 2 of the mechanical sensor unit of this invention.

FIGS. 2 and 3 show three axis mechanical sensor unit 10 made up of an outer case 16, a proof mass 18, and six compliant length extensional mode piezoelectric beams: beam 20, beam 20A, beam 20B, beam 20C, beam 20D, and beam 20E. Because of design symmetry of three axis mechanical sensor unit 10, FIG. 3, which is a three axis diametrically opposing view with respect to FIG. 2, is identical to FIG. 2 except for identification of specific parts.

Said beams are arranged in three pairs of two substantially collinear beams, with said resulting collinear directions substantially mutually orthogonal. Said beams comprise a set of mechanical spring elements having substantially equal mechanical translational spring rates along all directions connecting proof mass 18 to outer case 16.

Figure 4:
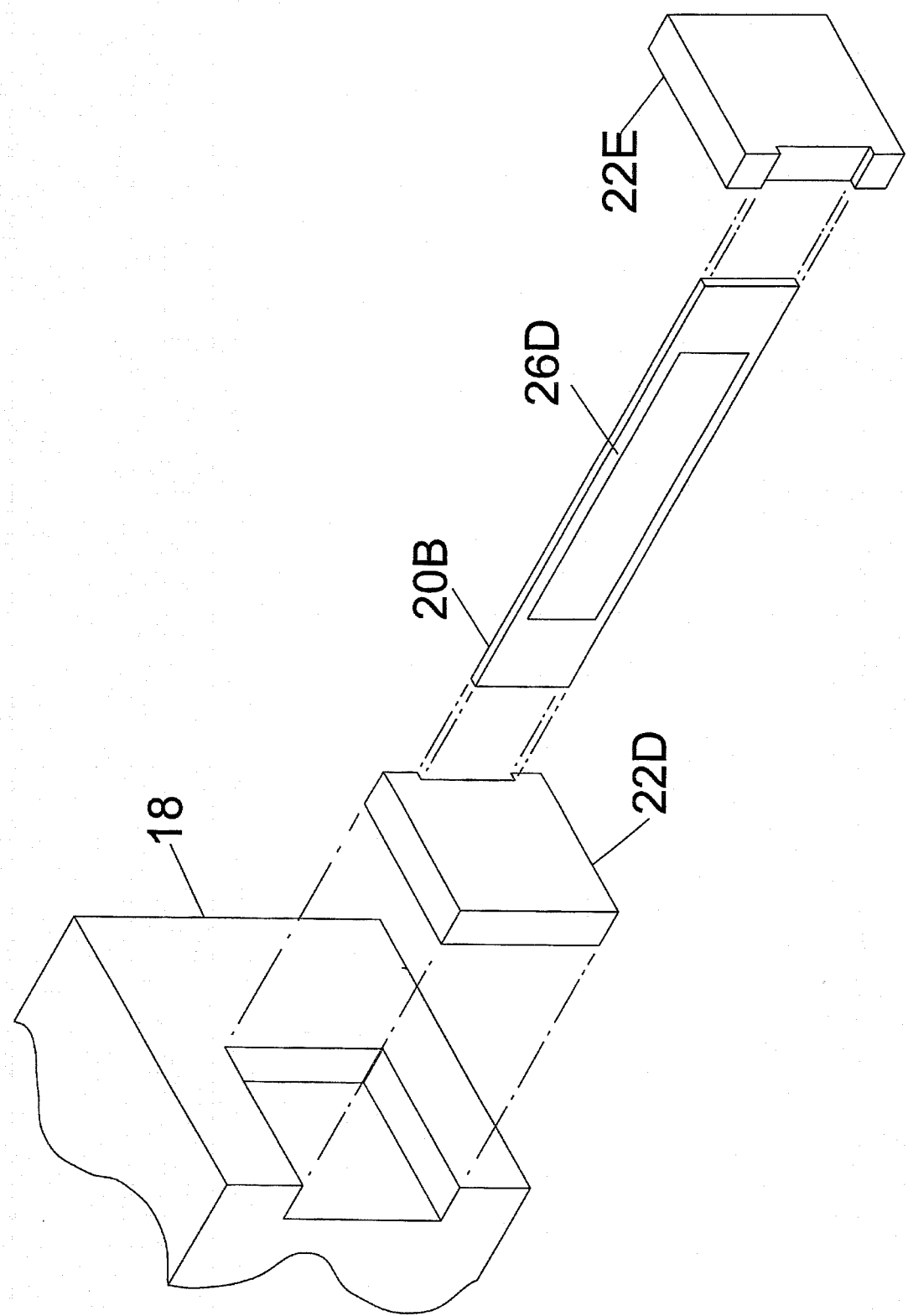
FIG. 4 is an exploded view of a single piezoelectric beam along the Y-axis and its attachments to the proof mass and the case.

Clamping blocks 22, 22A, 22B, 22C, 22D, 22E, 22F, 22G, 22H, 22I, 22J, and 22K together with their mechanical interfaces with outer case 16 and proof mass 18, comprise controlled compression clamping attachments for beam 20, 20A, 20B, 20C, 20D, and 20E mechanical terminations, as shown in FIGS. 2,3, and 4. The preferred embodiment of this invention employs length extensional mode piezoelectric beams to make up said set of spring elements with electromechanical coupling means.

Piezoelectric beams 20, 20A, 20B, 20C, 20D, and 20E are each a piezoelectric material rectangular solid made up of either crystalline alphaquartz or a piezoceramic material, such as lead zirconate titanate. Length extensional mode piezoelectric beams are fabricated by emplacement of electrode pairs across the narrowest dimension of said piezoelectric material rectangular solid, and by selection of piezoelectric axes orientation such that application of electrical voltage to said electrodes results in a mechanical stress substantially along the largest dimension, the length axis, of said rectangular solid. As shown in FIGS. 2 and 3, said length axis of each beam is substantially oriented along a separate axis of a mutually orthogonal three axis coordinate system XYZ fixed with respect to outer case 16.

Piezoelectric beams 20, 20A, 20B, 20C, 20D, and 20E have substantially identical physical dimensions, crystal axis orientations, as well as symmetrical installations. This results in substantially equal mechanical translational spring rates in all directions with respect to mounting of proof mass 18, and it also results in consequent substantially equal translational mode natural mechanical resonant frequencies along X, Y, and Z axes. Translational mode natural mechanical resonant frequency for any axis is calculated as $$\frac{1}{2\pi} \sqrt{\frac{K_{11}}{m}},$$

where $Y_{11}$ is direct axis mechanical translational spring rate, and m is value of proof mass 18. Translational mode natural mechanical resonant frequency is set to a value one or more orders of magnitude greater than any external vibration isolator roll-off frequency for anticipated input translational vibration motion frequency spectra to three axis mechanical sensor unit 10. Roll-off frequency in this context is defined as that frequency above which the magnitude of vibration experienced by three axis mechanical sensor unit 10 is decreasing with respect to frequency at a rate of at least 12 decibels per octave. For expected values of said roll-off frequency of 100 Hz or less, a translational mode natural mechanical resonant frequency is generally set a value between 1000 Hz and 10,000 Hz.

Because of expected variations of physical dimensions and mounting of beams 20, 20A, 20B, 20C, 20D, and 20E due to reasonably set tolerances, actual translational mode natural mechanical resonant frequencies along directions X, Y, and Z may differ by small amounts, depending upon said tolerances.

Length axes of beam pair 20–20A, beam pair 20B–200 and beam pair 20D–20D are oriented substantially along X, Y, and Z axis directions of three axis mechanical sensor unit 10, respectively, as shown in FIGS. 2 and 3. Because of anticipated small errors in manufacture and assembly, length axes of said beam pairs are generally not precisely aligned with directions X, Y, and Z. Length axes of said beam pairs also substantially intersect proof mass 18 center of mass.

Piezoelectric beams 20, 20A, 20B, 20C, 20D, and 20E are plated with two sided, symmetrical, metallic electrode pairs 26–26A, electrode pair 26B–26C, electrode pair 26D–26E, electrode pair 26F–26G, electrode pair 26H–26I, and electrode pair 26J–26K, respectively, as shown in FIGS. 2 and 3. This establishes a means for externally connecting electrical voltages and currents to said electrode pairs.. Each of said electrodes is made up, for example, of a thin layer of fired or vacuum deposited silver, gold, aluminum or electroless nickel. Connected to electrodes 26, 26A, 26B, 26C, 26D, 26E, 26F, 26G, 26H, 26I, 26J, and 26K are wire leads 28, 28A, 28B, 28C, 28D, 28E, 28F, 28G, 28H, 28I, 28J, and 28K, respectively.

Wire leads 28, 28A, 28B, 28C, 28D, 28E, 28F, 28G, 28H, 28I, 28J, and 28K connect to electrical feed-through elements 30, 30A, 30B, 30C, 30D, 30E, 30F, 30G, 30H, 30I, 30J and 30K, respectively, as shown in FIGS. 2 and 3. All of said electrical feed-through elements are mounted in outer case 16.

Figure 7:
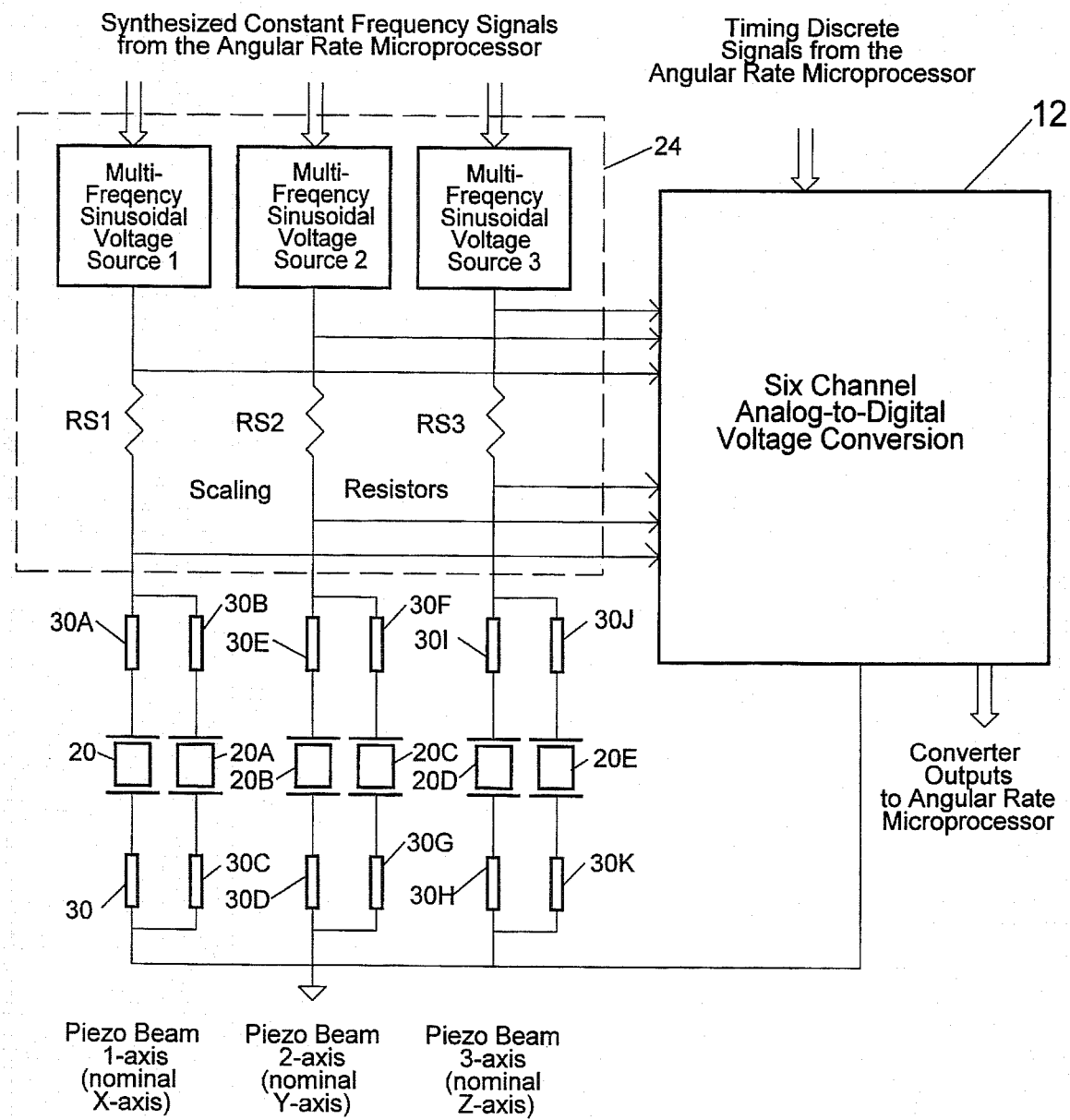
FIG. 7 is a schematic block diagram of the mechanical sensor unit, the multi-frequency sinusoidal voltage source subsystem, and the six channel analog-to-digital voltage conversion subsystem interface, showing the electrical voltage connections.

External terminals of electrical feed-through elements are connected in pairs to multi-frequency sinusoidal voltage source subsystem 24 and six channel analog-to-digital voltage conversion subsystem 12 as shown in FIG. 7. Said pairs are electrical feed-through elements 30A–30B, 30–30C, 30E–30F, 30D–30G, 30I–30J and 30H–30K, as shown.

Figure 5:
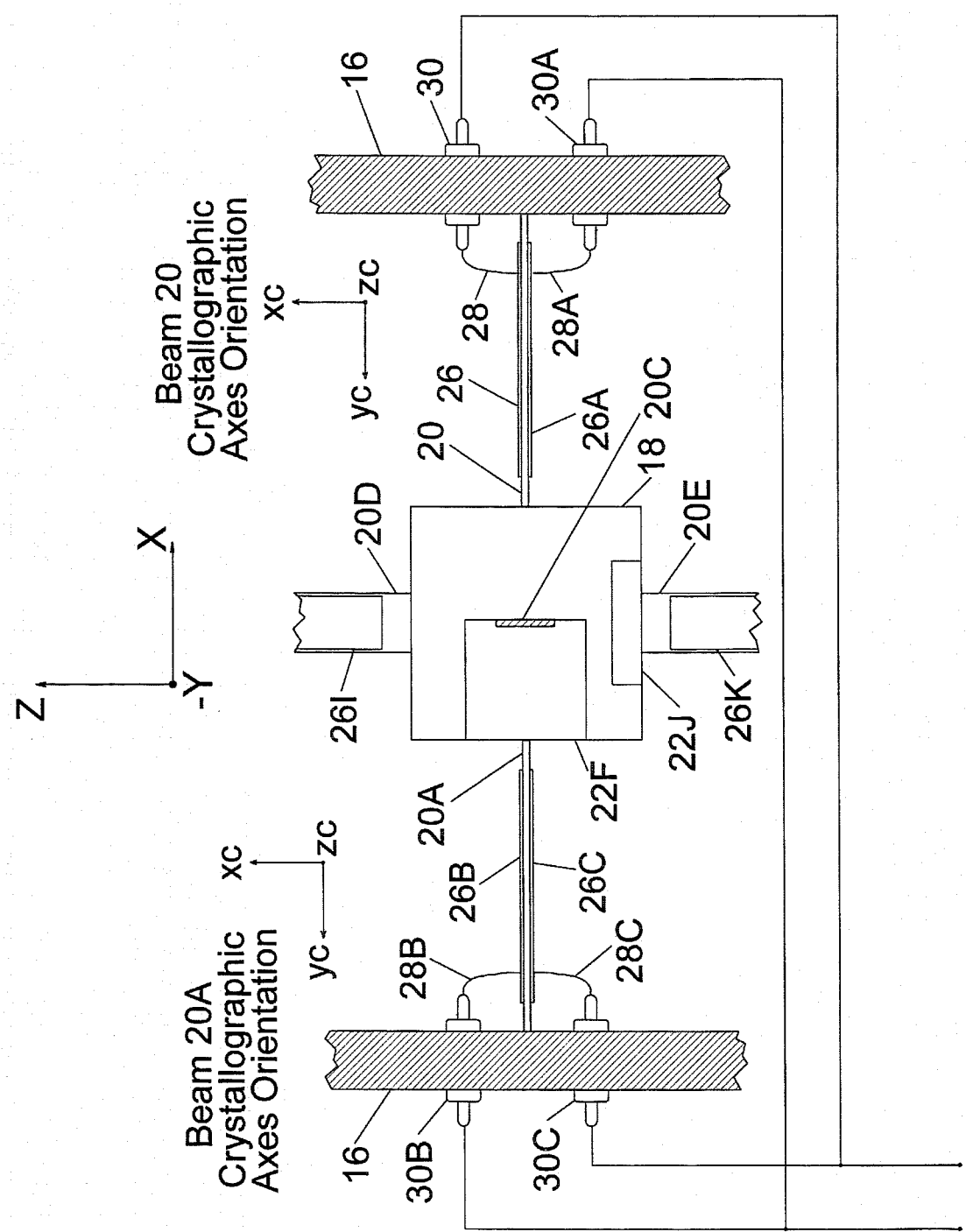
FIG. 5 is a fragmentary section view showing the electrical connections to two of the piezoelectric beams and their crystallographic axes orientations.

FIG. 5 shows orientation of crystallographic axes for X-axis beam pair 20–20A and electrical parallel connection of electrodes 26, 26A, 26B, and 26C. Y and Z axis corresponding elements are similarly interrelated. While other combinations of crystallographic axes orientations and electrical connections are possible, in the preferred embodiment of this invention a configuration shown in FIG. 5 has been selected. Any other similar combination may also be employed provided that crystallographic axes orientation of beam 20A is substantially identical to that of beam 20 and upper electrode of beam 20 is connected to lower electrode of beam 20A and vice versa. Piezoelectrically induced length and shear motions of beams 20 and 20A, in this arrangement, result in only a net translational force upon proof mass 18 and substantially no torques upon said proof mass.

One lead from each of said pairs 30A–30B, 30E–30F, and 30I–30J is connected to one of a set of known value scaling resistors RS1, RS2, and RS3, respectively, as shown in FIG. 7. Said resistors are connected to separate multi-frequency sinusoidal voltage sources 1, 2, and 3, respectively, of multifrequency sinusoidal voltage source subsystem 24. Remaining leads from each said pair of external terminals of electrical feed-through elements 30–30C, 30D–30G, and 30H–30K are connected to a common electrical ground as shown.

Each side of scaling resistors RS1, RS2, and RS3 is connected to separate voltage analog-to-digital converter channels. This results in six channels of analog-to-digital voltage conversion. Use of these electrical connections results in a direct measure of electrical voltage across each pair of piezoelectric terminals. Also obtained is an indirect measure of electrical current flowing through said pairs of piezoelectric terminals by measurement of voltage across each said series connected, known value, scaling resistor.

Electrical drive voltages are each made up of a multiplicity of additive separate frequency sinusoidal signals with respect to time. These electrical drive voltages are applied to external terminals of electrical feed-through element pairs 30A–30B, 30E–30F, and 30I–30J. While other choices of driving frequency sets can be used, in the preferred embodiment of this invention each multi-frequency sinusoidal voltage source outputs three separate and unique, substantially constant frequency, substantially constant amplitude, and substantially sinusoidal waveform voltage signals. Two of said separate frequencies for each axis are set to be near said translational mode natural mechanical resonant frequency nominal value. A third frequency for each axis is set at a factor of approximately 1.9 times said translational mode natural mechanical resonant frequency nominal value. This factor value of 1.9 is not critical.

Mechanical motion responses of proof mass 18 with respect to driving voltage frequency near said resonant frequency are, as desired, particularly sensitive to electrical and mechanical parameters to be measured. Setting said third frequency at said factor of 1.9 is to obtain an observable and accurate measure of electrical capacity parameters of said beams 20, 20A, 20B, 20C, 20D, and 20E.

Six total frequencies which are near said translational mode natural mechanical resonant frequency are separated from each other by approximately one percent of said translational mode mechanical sensor natural mechanical resonant frequency nominal value. The optimum selected value for said separation is proportional to ratio of nominal direct axis mechanical damping parameter of beams 20, 20A, 20B, 20C, 20D, and 20E to nominal value of proof mass 18. Said six frequencies mean value is set at said translational mode natural mechanical resonant frequency nominal value. Accordingly, nine separate driving frequencies are synthesized and set from angular rate microprocessor 14 by a crystal oscillator timing reference shown in FIG. 10. Said crystal oscillator timing reference provides time synchronization for said nine separate driving frequencies. In addition, said crystal oscillator timing reference provides time synchronization for sampling rate of six channel analog-to-digital voltage conversion subsystem 12.

Figure 8:
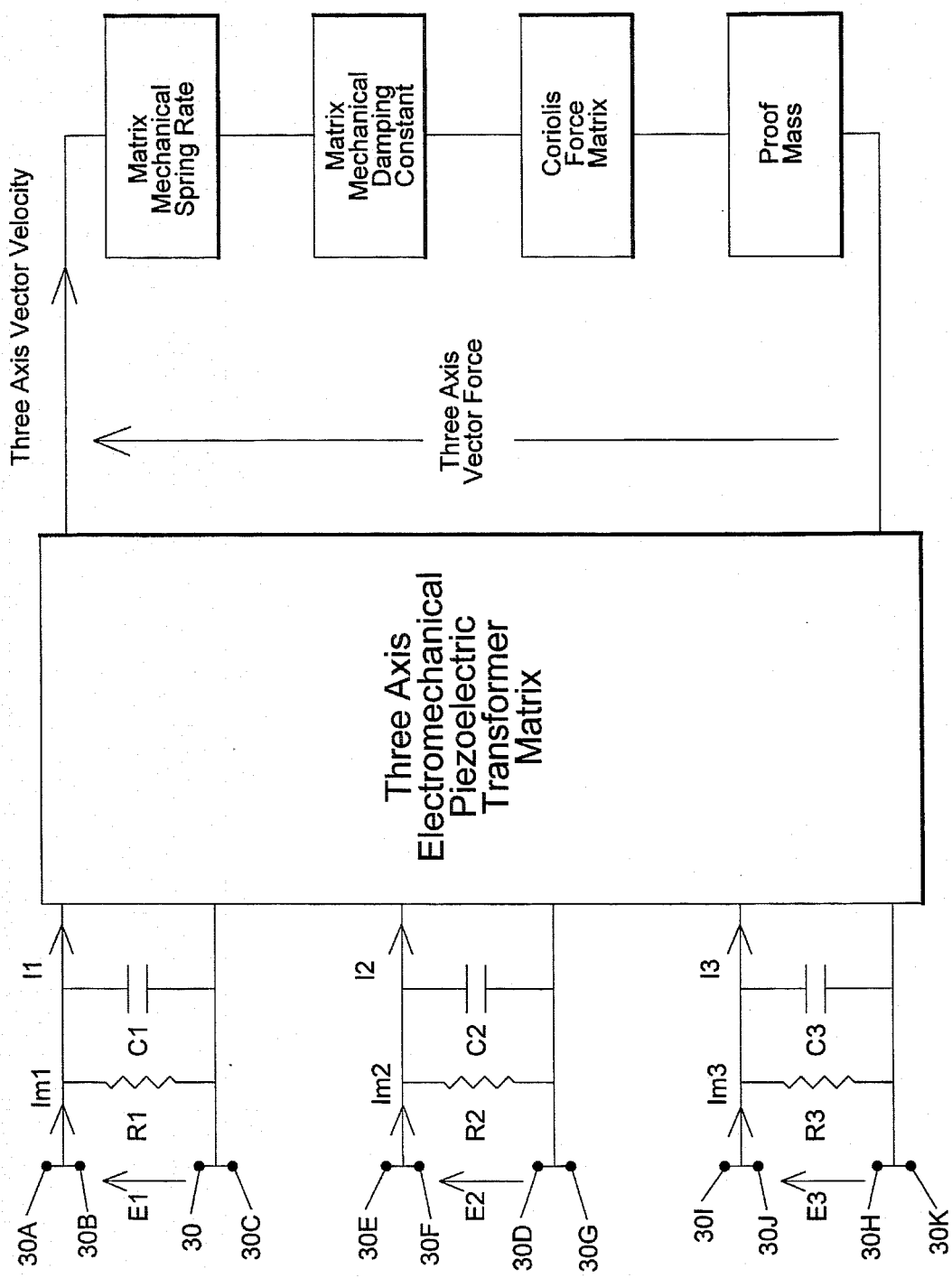
FIG. 8 is a schematic diagram showing the piezoelectric electrical-to-mechanical interface.
Figure 10:
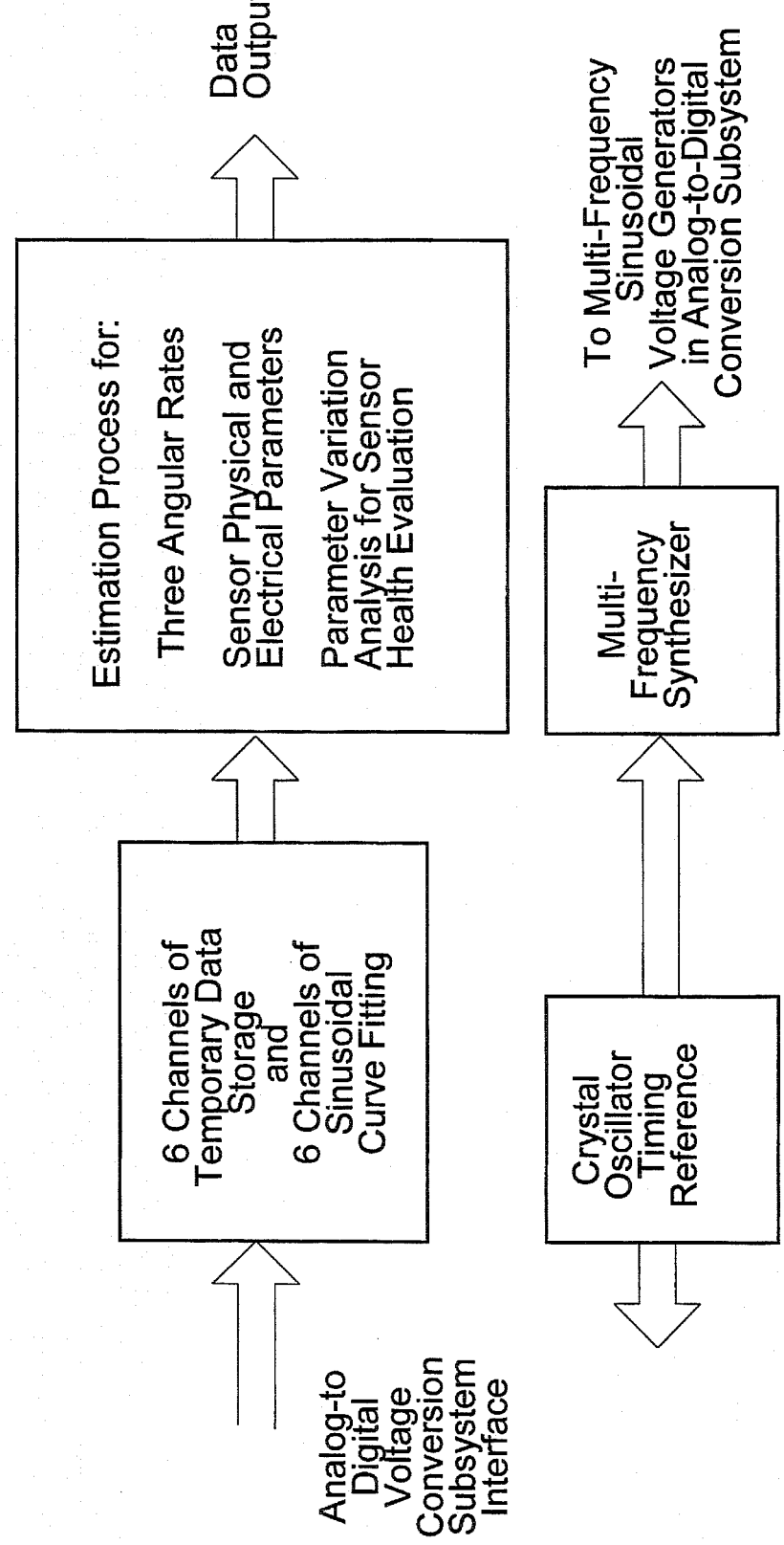
FIG. 10 is a top level block diagram of the angular rate microprocessor functions.

Six channel analog-to-digital voltage conversion subsystem 12 provides, as shown in FIG. 10, separate time periodic data sample measurements of voltage outputs of multi-frequency sinusoidal voltage source subsystem 24 and of beam piezoelectric voltages at electrical feed-through element pairs 30A–30B, 30E–30F, and 30I–30J, shown as E1, E2, and E3, respectively, in FIG. 8. All six input voltage signals are converted simultaneously and periodically at a sampling rate which is preferably at least 400 times greater than angular rate microprocessor 14 overall computation output rate. Said sampling rate is also preferably at least five times greater than translational mode natural mechanical resonant frequency.

Operation—General

Operation of a self-calibrating three axis angular rate sensor is carried out by:

(1) Piezoelectrically driving proof mass 18 of mechanical sensor unit 10 with known frequency sinusoidal voltages, as shown in FIG. 7.

(2) Utilizing a set of equations which define relationship of proof mass motion to measured piezolectric beam voltages E1, E2, E3 and currents Im1, Im2, Im3 shown in FIG. 8.

Figure 11:
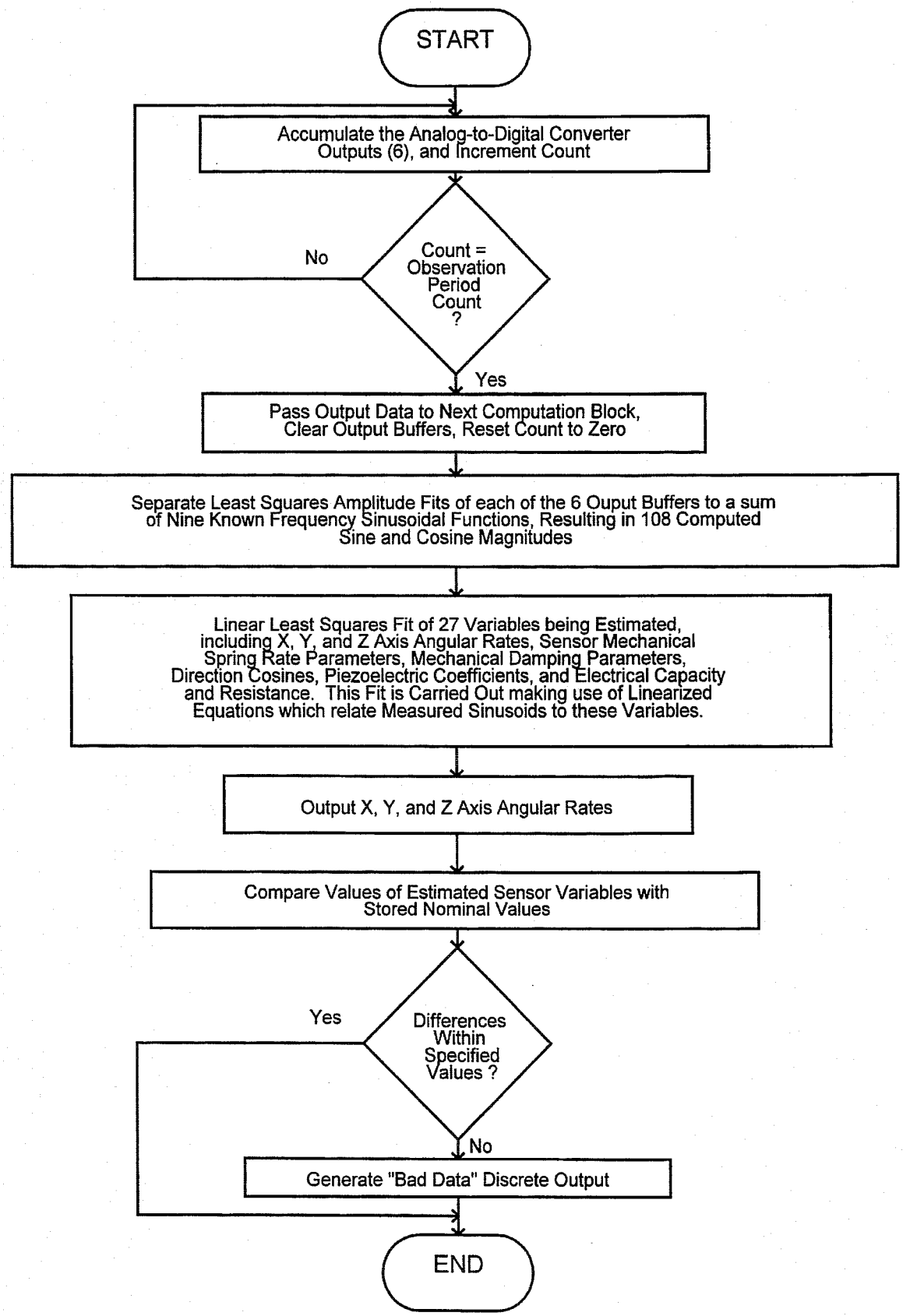
FIG. 11 is a computer program flowchart for the angular rate microprocessor.

(3) Fitting said piezoelectric beam voltage measurements to a set of sinusoidal time functions using angular rate microprocessor 14 as shown in FIGS. 10 and 11, and, by use of said fitted sinusoidal functions, (4) Computing input angular rate about three axes of coordinate system XYZ shown in FIGS. 2 and 3, as shown in FIGS. 10 and 11 by use of said measurement set of sinusoidal functions.

(5) Computing specific electrical and mechanical parameters and coefficients of three axis mechanical sensor unit 10, as shown in FIGS. 10 and 11 by use of said measurement set of sinusoidal functions.

This operation is described in detail in the following paragraphs:

Operation—Piezoelectric Drive of Proof Mass

Rectangular solid piezoelectric materials with specifically selected crystal axis orientations experience a length expansion along an axis orthogonal to direction of electric field. For example, for an x-cut crystalline alpha-quartz bar, an applied positive voltage field along crystal xc-axis direction results in a contraction along crystal yc-axis shown in FIG. 5. A negative applied voltage along this same crystal x-axis results in an expansion along crystal yc-axis. In this way, as also illustrated by FIG. 5, a positive voltage at electrical feed-through elements 30A and 30B with respect to electrical feed-through elements 30 and 30C results in a length contraction of beam 20A and a length expansion of beam 20. These changes in length of beams 20A and 20 result in a "push-pull" force upon proof mass 18 in the negative X direction of coordinate system XYZ shown in FIGS. 2, 3, and 5. Similar relationships between applied voltages and resulting forces upon proof mass 18 exist for Y-axis and Z-axis of said XYZ coordinate system. It must be noted here that crystal xc-axis and crystal yc-axis are not necessarily related to X-axis and Y-axis, respectively, of said XYZ coordinate system.

Accordingly, as shown in FIG. 7, an application of electrical voltages with respect to ground at electrical feed-through element pairs 30A–30B, 30E–30F, and 30I–30J results in forces upon proof mass 18 in directions X, Y, and Z, respectively of said XYZ coordinate system, the direction of said forces depending upon polarity of said applied electrical voltages.

Figure 6:
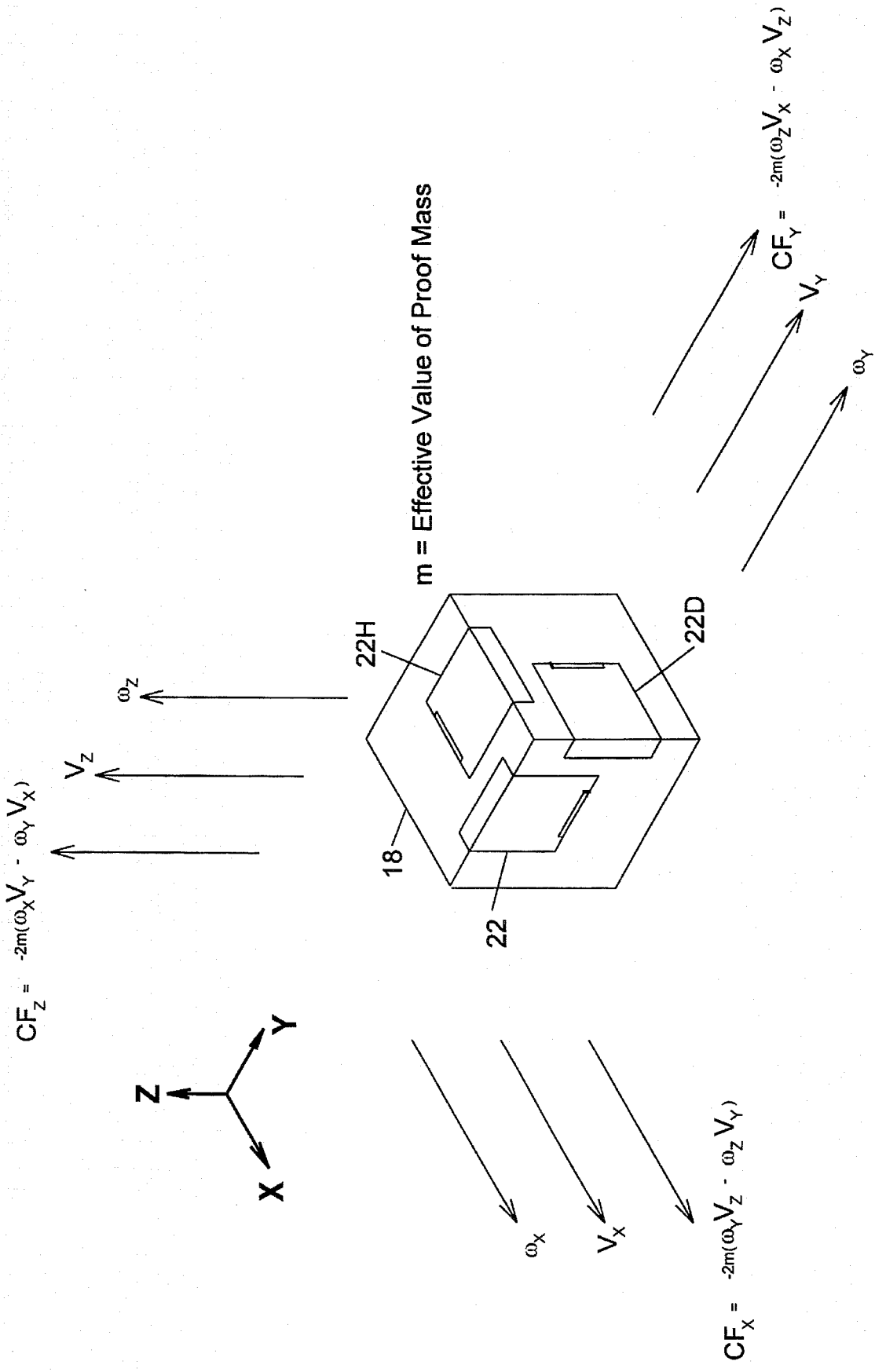
FIG. 6 shows the relationship between the three axis coriolis force components and the three axis components of proof mass velocity and angular rate.

Therefore, application of sinusoidal voltages from multi-frequency sinusoidal voltage source subsystem 24 to electrical feed-through element pairs 30A–30B, 30E–30F, and 30I–30J shown in FIGS. 7 and 8 results in piezoelectrically generated sinusoidal forces along all three axes of proof mass 18. These forces result in sinusoidal translational motions and velocities of proof mass 18. Said translational velocities of proof mass 18, in combination with input angular rates about XYZ coordinate system shown in FIG. 6, result in generation of coriolis forces acting upon proof mass 18. FIG. 6 illustrates said coriolis force generation for angular rates $\omega_x$, $\omega_y$, and $\omega_z$ about X, Y and Z of said XYZ coordinate system in combination with velocities VX, VY, and VZ of proof mass 18 with respect to outer case 16 along said X, Y, and Z axis directions. Generated coriolis forces are a negative vector cross product of a vector input angular rate to three axis mechanical sensor unit 10 and vector velocity of proof mass 18 with respect to outer case 16 multiplied by twice the effective mass of proof mass 18. For said assumed angular rates and said velocities the coriolis forces generated upon proof mass 18 are, as shown in FIG. 6:

X-axis component of coriolis force, $$CF_x = -2m(\omega_y V_z - \omega_z V_y),$$

Y-axis component of coriolis force, $$CF_y = -2m(\omega_z V_x - \omega_x V_z),$$

and

Z-axis component of coriolis force, $$CF_z = -2m(\omega_x V_y - \omega_y V_x).$$

It is seen that each said coriolis force component is a function of two separate products of said angular rate and said velocity components.

Multi-frequency sinusoidal voltage source subsystem 24 of FIG. 1 supplies driving voltages for each axis, as shown in FIG. 7, applying corresponding driving forces along length axes of each beam of three axis mechanical sensor unit 10. FIG. 8 shows electrical voltage and current interface to all twelve electrical feed-through element pairs 30A–30B, 30–30C, 30E–30F, 30D–30G, 30I–30J, and 30H–30K.

Also with reference to FIG. 8, piezoelectric coupling of externally connected electrical voltages and currents to three axis mechanical sensor unit 10 mechanical parameters takes place analytically by means of a three axis electromechanical piezoelectric transformer matrix. Said matrix takes into account angular misalignments between coordinate system XYZ and length axis orientation of beams 20, 20A, 20B, 20D, 20D, and 20E, as shown in FIGS. 2 and 3, as well as inherent direct axis and cross axis coefficients of piezoelectric coupling. Because said angular misalignments and said piezoelectric coupling coefficients are not immediately known and vary with time, they are, as an important part of the operation of this invention, automatically and continuously computed, as shown below by Equations (1) through (28) and associated discussion of said equations.

Said piezoelectric coupling coefficients relate input vector voltage to output vector force and identical said piezoelectric coupling coefficients relate output mass vector velocity to input vector electrical current. For this reason each collinear beam pair 20–20A, 20B–20C, and 20D–20E can be considered as an equivalent single piezoelectric beam because of a parallel electrical connection of each said pair of beam electrodes as exemplified by FIG. 5. Said parallel electrical connection sums electrical current for each said beam pair for a common vector velocity of proof mass 18, and sums forces upon said proof mass 18 for a common driving voltage.

Operation—Equations Description

Figure 8A:
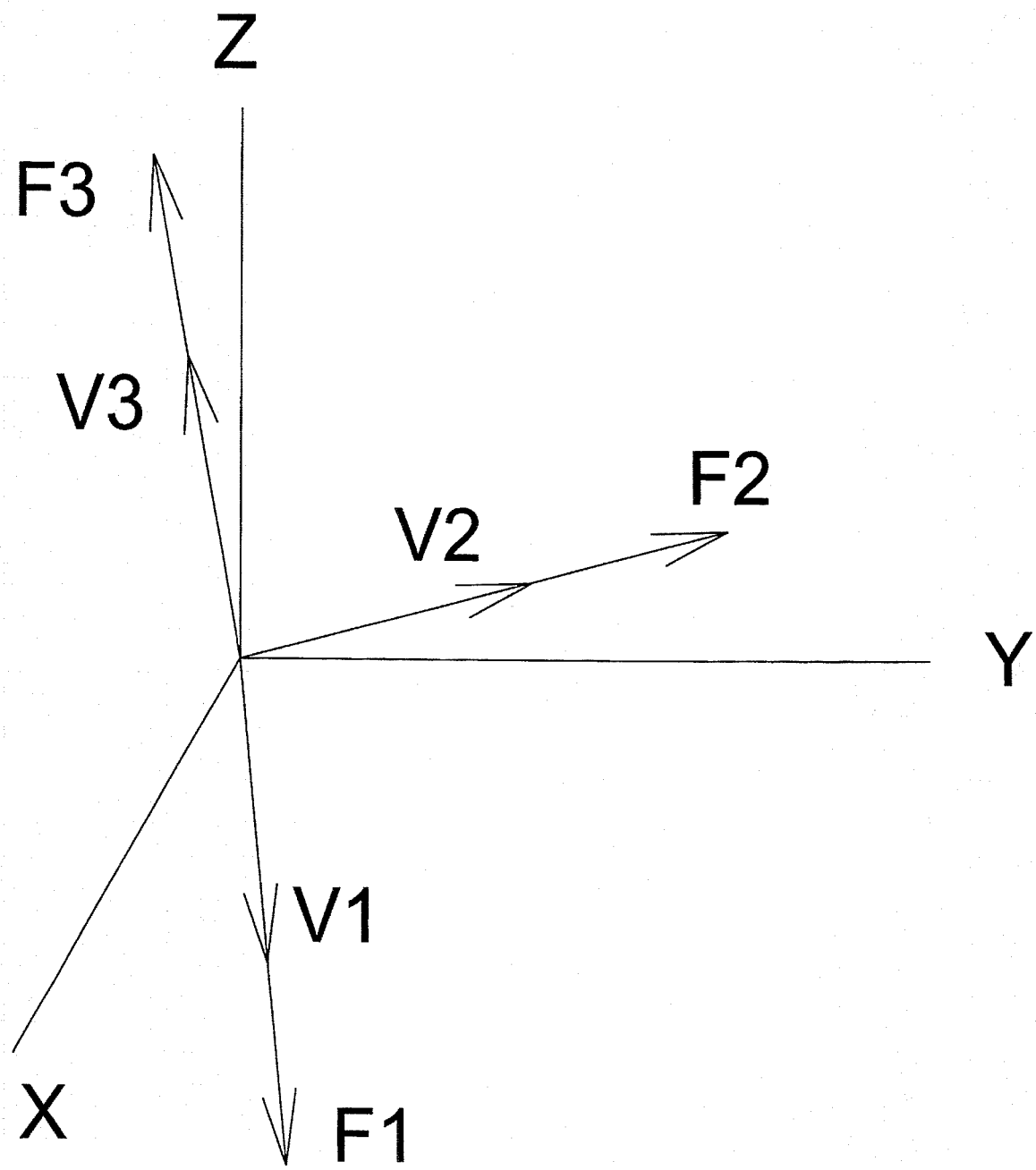
FIG. 8A shows the three axis geometrical relationship between piezoelectric generated forces and velocities and coordinate system XYZ.

FIG. 8A shows V1, V2, and V3 translational velocity vector components of proof mass 18 with respect to outer case 16 corresponding to piezoelectrical currents I1, I2, and I3, respectively, shown in FIG. 8; FIG. 8A also shows piezoelectrically generated F1, F2, and F3 force vector components corresponding to voltages E1, E2, and E3 shown in FIG. 8. Because these are piezoelectrically related electrical voltages, electrical currents, forces and velocities, the vector combinations V1-F1, V2-F2, and V3-F3 are collinear, as shown in FIG. 8A. These relationships, expressed mathematically, are as follows;

$$F1 = N1 * E1; \quad (1)$$
$$F2 = N2 * E2; \quad (2)$$
$$F3 = N3 * E3; \quad (3)$$
$$I1 = N1 *'V1; \quad (4)$$
$$I2 = N2 *'V2; \quad (5)$$
$$I3 = N3 *'V3; \quad (6)$$

Where N1, N2, and N3 are piezoelectric coupling coefficients for collinear beam pairs 20–20A, 20B–20C, and 20D–20E, respectively.

Velocities V1, V2, and V3 are related to VX, VY, and VZ, corresponding velocity components along X, Y, and Z axes, respectively by sets of direction cosines a11, a12, a13, etc. as follows:

$$V1 = a11*VX + a12*VY + a13*VZ \quad (7)$$

$$V2 = a21*VX + a22*VY + a23*VZ \quad (8)$$

$$V3 = a31*VX + a32*VY + a33*VZ \quad (9)$$

Similarly, force vector components FX, FY, and FZ along X, Y, and Z axes, respectively are expressed mathematically as:

$$FX = a11*F1 + a21*F2 + a31*F3 \quad (10)$$

$$FY = a12*F1 + a22*F2 + a32*F3 \quad (11)$$

$$FZ = a13*F1 + a23*F2 + a33*F3 \quad (12)$$

Substituting Equations (1) through (6) into Equations (7) through (10) result in matrix equations as follows:

$$\begin{bmatrix} \frac{I1}{N1} \\ \frac{I2}{N2} \\ \frac{I3}{N3} \end{bmatrix} = \begin{bmatrix} a11 & a12 & a13 \\ a21 & a22 & a23 \\ a31 & a32 & a33 \end{bmatrix} \begin{bmatrix} VX \\ VY \\ VZ \end{bmatrix} \quad (13)$$

$$\begin{bmatrix} FX \\ FY \\ FZ \end{bmatrix} = \begin{bmatrix} a11 & a21 & a31 \\ a12 & a22 & a32 \\ a13 & a23 & a33 \end{bmatrix} \begin{bmatrix} N1*E1 \\ N2*E2 \\ N3*E3 \end{bmatrix} \quad (14)$$

Equations (13) and (14) can be expressed as:

$$L = aV \quad (15)$$
$$F = a^T P \quad (16)$$

Where $$L = \begin{bmatrix} \frac{I1}{N1} \\ \frac{I2}{N2} \\ \frac{I3}{N3} \end{bmatrix} \tag{17}$$

$$P = \begin{bmatrix} N1 * E1 \\ N2 * E2 \\ N3 * E3 \end{bmatrix} \tag{18}$$

$$a = \begin{bmatrix} a11 & a12 & a13 \\ a21 & a22 & a23 \\ a31 & a32 & a33 \end{bmatrix} \tag{19}$$

and $a^T$ is the matrix transpose of a.

Making use of classical dynamics for suspended proof mass 18 and known form of piezoelectric coupling coefficients results in two steady-state frequency response matrix equations as follows:

$$F = a^T P = KU + jhDU - h^2 m(W \cdot U) - W^2 U) - jhmj(2W \times U) \tag{20}$$

$$L = jhaU = L_M - EG - jhEC \tag{21}$$

Where h is frequency of operation in Hz multiplied by $2\pi$, m is known value of proof mass 18, $j = \sqrt{-1}$, $$L_M = \begin{bmatrix} \frac{Im1}{N1} \\ \frac{Im2}{N2} \\ \frac{Im3}{N3} \end{bmatrix} \tag{22}$$

represents measured electrical currents Im1, Im2, and Im3 shown in FIG. 8 divided by their respective piezoelectric coefficients N1, N2, and N3, $$G = \begin{bmatrix} \frac{1}{R1 * N1} \\ \frac{1}{R2 * N2} \\ \frac{1}{R3 * N3} \end{bmatrix} \tag{23}$$

represents reciprocals of products of piezoelectric leakage resistances R1, R2, and R3 shown in FIG. 8 and their respective piezoelectric coefficients N1, N2, and N3, $$C = \begin{bmatrix} \frac{C1}{N1} \\ \frac{C2}{N2} \\ \frac{C3}{N3} \end{bmatrix} \tag{24}$$

represents electrical capacities C1, C2, and C3 shown in FIG. 8 divided by respective piezoelectric coefficients N1, N2, and N3, $$U = \begin{bmatrix} X \\ Y \\ Z \end{bmatrix} \tag{25}$$

represents displacement of proof mass 18, where X, Y, and Z are displacement motions of proof mass 18 with respect to outer case 16 along these said respective axes, as shown in FIGS. 2 and 3, symmetrical K matrix $$K = \begin{bmatrix} K11 & K12 & K13 \\ K12 & K22 & K23 \\ K13 & K23 & K33 \end{bmatrix} \tag{26}$$

represents relationship between mechanical spring forces on proof mass 18 and a general three axis vector displacement of said proof mass 18 with respect to XYZ coordinate system shown in FIG. 2. K11, K22, and K33 are direct axis mechanical spring rate parameters along said X, Y, and Z axes, respectively; cross axis mechanical spring rate parameters K12, K13, and K23 take into account both misalignment angles of beams 20, 20A, 20B, 20C, 20D and 20E and general anisotropic spring rates of piezoelectric materials, symmetrical D matrix $$D = \begin{bmatrix} D11 & D12 & D13 \\ D12 & D22 & D23 \\ D13 & D23 & D33 \end{bmatrix} \tag{27}$$

relates mechanical damping forces on proof mass 18 to said X, Y, and Z axis velocity components. D11, D22, and D33 are direct axis mechanical damping parameters; D12, D13, and D23 are cross axis mechanical damping parameters, a set of three input angular rates to be measured about said X, Y, and Z axes is denoted by vector $$W = \begin{bmatrix} \omega_X \\ \omega_Y \\ \omega_Z \end{bmatrix} \tag{28}$$

where $\omega_x$, $\omega_y$, and $\omega_z$ are input angular rates about said X-axis, said Y-axis and said Z-axis, respectively.

Equation (20) states that piezoelectrically coupled vector force F is equal to summed spring force vector KU, damping force vector jhDU, acceleration of proof mass 18 force vector $-h^2 mU$, proof mass 18 centrifugal force vector $-m(W(W \cdot U) - W^2 U)$, and proof mass 18 coriolis force vector $-jhm(2W \times U)$. Scalar term W in Equation (20) represents magnitude of total vector input angular rate.

Term $m(W \cdot U) - W^2 U)$ in Equation 20 represents centrifugal force acting upon proof mass 18, and term $jhm(2W \times U)$ represents coriolis force acting upon proof mass 18. In these terms denotes vector dot product and x denotes vector cross product. Because, in the preferred embodiment of this invention, coriolis force is many orders of magnitude greater than centrifugal force, centrifugal force can generally be safely neglecting in modeling this process. FIG. 8 illustrates force summation of Equation (20) with centrifugal force neglected.

Equation (21) states that piezoelectrically coupled electrical current related vector I, is equal to summed measured current related vector $L_M$, current related vector of piezoelectric electrical leakage resistances −EG, and current related vector of piezoelectric electrical capacities −jhEC, as shown in FIG. 8.

Direction cosine a matrix precisely defines XYZ coordinate system orientation shown in FIGS. 2 and 3. Three elements, a21, a31, and a32, of matrix a are defined to be zero, specifically requiring:

(1) Said X-axis orientation defined as direction along which only voltage E 1 results in a piezoelectric force. This is also direction perpendicular to the plane containing E2 and E3 induced piezoelectric force vectors.

(2) Said Y-axis orientation defined as direction in which only voltages E 1 and E2 result in a force along said Y-axis. This is also direction in said plane containing E2 and E3 induced piezoelectric force vectors, which direction is perpendicular to E3 induced piezoelectric force vector.

(3) Said Z-axis orientation defined as perpendicular to both said X-axis and said Y-axis, forming mutually orthogonal axes.

Because there are only two independent direction cosine elements per row, and there are three rows in direction cosine matrix a there are, in general, a total of six independent direction cosine elements. Since three said elements are set to zero by conditions (1) through (3), above, there remain only a total of three unknown direction cosine elements.

While in the preferred embodiment of this invention piezoelectric coupling is used, in general, electromechanical coupling coefficients for any selected form of electromechanical coupling have directly related matrix structures.

An example of expansion of one matrix term of Equation (20), KU, from matrix to complex form is shown in FIG. 9. K matrix direct axis and cross axis spring rate parameters are shown in FIG. 9. Also shown are X, Y, and Z axis force components on proof mass 18 resulting from all spring rate parameters and displacements X, Y, and Z of proof mass 18. Since said proof mass 18 displacements in general have both cosine and sine time function components, and because Equations (20) through (28) are defined to represent steady-state frequency domain sinusoidal quantities, FIG. 9 expressions for force components contain both real and imaginary terms, representing said cosine and sine terms, respectively. Expansions of remaining terms are carried out using identical methodology.

For each of nine separate driving frequencies generated by multi-frequency sinusoidal voltage source 24 shown in FIG. 7, six equations defining input voltages E1, E2, and E3 relationship to corresponding six input currents Im1, Im2, and Im3, as shown in FIG. 7, are derived as follows:

(1) Matrix equation (20), above, is expanded into three complex equations, as exemplified by the expansion of KU shown in FIG. 9. Each of these complex equations is then written as two scalar equations, representing real and imaginary parts of said complex equations, resulting in a total of six scalar equations for each separate frequency.

(2) Matrix equation (21), above, is likewise expanded into three complex equations, which are then solved for X, Y, and Z. These complex expressions for X, Y, and Z are then separated into real and imaginary parts of X, Y, and Z. Said real and imaginary parts are expressed as functions of angular rate inputs, electrical and mechanical parameters, piezoelectric coupling coefficients, and measured voltages as defined by Equations (22) through (28). For each separate frequency, cosine magnitudes of said measured voltages are directly equivalent to real parts of said measured voltages. Negative sine magnitudes of said measured voltages are directly equivalent to imaginary parts of said measured voltages.

(3) Said expressions for real and imaginary parts of X, Y, and Z are then substituted into said six equations defined in paragraph (1), above. This results in six scalar equations that include only variables in said angular rate inputs, electrical and mechanical parameters, direction cosines, piezoelectric coupling coefficients, and measured voltages.

Since there are nine separate frequencies and six equations per frequency, as described in paragraph (3), above, there results a total of nine times six or 54 scalar equations. Said 54 equations are used to solve for 3 angular rates as defined by Equation (28), 6 electrical parameters as defined by Equations (23) and (24), 6 mechanical compliance parameters as represented by Equation (26), mechanical damping parameters as defined by Equation (27), 3 direction cosines as defined by Equation (19) and 3 piezoelectric coupling coefficients as defined by Equations (1) through (6), a total of 27 outputs.

Operation—Voltage Measurement Fitting and Angular Rate and Parameter Computation As shown in FIG. 10, angular rate microprocessor 14 accepts all six outputs of six-channel analog-to-digital voltage conversion subsystem 12. Angular rate microprocessor 14 also provides temporary storage for these outputs over said overall computation output rate period as shown in FIG. 11. While this output rate period can be set to different constant values, in the preferred embodiment of this invention said period is set to a constant value of approximately 0.01 seconds. Angular rate microprocessor 14, as shown in FIG. 11 flowchart, uses each constant computation time block of analog-to-digital voltage conversion samples as input data for a linear least squares fit to a known set of nine driving frequencies. This least squares fit is performed separately and independently for each six analog-to-digital voltage conversion system output. This computation process results in a total of six channels times nine frequencies times two outputs per frequency (sine and cosine components), or 108 computed sine and cosine magnitudes.

These magnitudes are then used as inputs for computing needed said 27 output estimates using said 54 scalar equations generated. Although a number of algorithm choices exist for providing said 27 output estimates, including a Kalman filter, in the preferred embodiment of the invention this solution is carried out using a linear least squares fit computational process, based upon a linear expansion of said 54 scalar equations with respect to an assumed reference point.

As shown in FIG. 11, not only are X, Y, and Z angular rates computed for each output rate period, but 24 physical parameters and coefficients are compared with their known nominal values. If, for any reason, one or more of these parameters or coefficients falls outside of a specified tolerance range, then proper operation of three axis mechanical sensor unit 10 is suspect, and a "bad data" discrete is output as a warning.

Because of significant separation of translational mode natural mechanical resonant frequency from said roll-off frequency of anticipated input vibration motion frequency spectrum, and because of extremely narrow frequency bands used by measurement means described above errors in output data caused by externally induced vibration forces acting upon proof mass 18 are minimized.

Conclusions, Ramifications, and Scope

It can be seen that, according to the invention, a digital output three axis angular rate sensor is provided, the accuracy of which is substantially independent of variations of mechanical sensor critical electrical and mechanical parameters and electromechanical coefficients. These variations have, until now, limited the performance of vibratory angular rate sensors. Satisfactory comparisons of computed outputs of said electrical and mechanical parameters and electromechanical coefficients with their normally expected values enable a verification of the validity of the basic angular rate output data. The invention makes use of available electronic technology to electrically excite a single proof mass into motion along three axes in order to induce coriolis forces in response to input angular rates. This electrical excitation is made up a multiplicity of sinusoidal signals with respect to time. Provided are the necessary means for voltage measurements and real time computation of the three axis input angular rates, using a microprocessor. Also provided are means for computation of said parameter and coefficient variations. Data extraction accuracies are attained which heretofore have not been obtainable with conventional methodologies.

Although the description above contains many specificities, these should not be construed as limiting the scope of the invention, but as merely providing illustrations of some of the presently preferred embodiments of this invention. Various other embodiments and ramifications are possible within its scope. For example, the use of electrostatic or electromagnetic electromechanical coupling in three axis mechanical sensor unit 10 in place of the piezoelectric coupling described as the preferred embodiment makes possible the same basic functions and outputs of three axis mechanical sensor unit 10, six-channel analog-to-digital voltage conversion subsystem 12, and angular rate microprocessor 14, and multi-frequency sinusoidal voltage source subsystem 24.

Thus the scope of the invention should be determined by the appended claims and their legal equivalents, rather than by the examples given.

What is claimed is:

1. A three axis angular rate sensor comprising:

a proof mass, an outer case, a set of mechanical spring elements connecting said proof mass to said outer case and having substantially equal mechanical translational spring rates along all directions, electromechanical coupling means for relating externally connected electrical voltages and electrical currents to forces upon said set of mechanical spring elements and to translational velocities of said proof mass with respect to a three axis coordinate system fixed in said outer case, electrical excitation means for applying said electrical voltages and said electrical currents as a multiplicity of additive separate frequency sinusoidal signals with respect to time to generate translational velocities of said proof mass along each axis of said coordinate system, and to generate consequent coriolis forces upon said proof mass in response to input angular rates, frequency setting means for fixing each of said frequency sinusoidal signals within a frequency band generally near a translational mode natural mechanical resonant frequency as determined by a combination of said proof mass and said equal mechanical translational spring rates of said set of mechanical spring elements, measurement means for obtaining time periodic data samples of said electrical voltages and said electrical currents of said electromechanical coupling means, electrical parameter computational means for determination from said measurement means electrical parameters of said electromechanical coupling means, mechanical spring rate computational means for determination from said measurement means direct axis and cross axis mechanical spring rate parameters of said set of mechanical spring elements, mechanical damping computational means for determination from said measurement means direct axis and cross axis mechanical damping parameters of said set of mechanical spring elements, electromechanical coupling computational means for determination from said measurement means direct axis and cross axis electromechanical coupling coefficients of said electromechanical coupling means, angular rate computational means of said outer case with respect to said three axis coordinate system from said measurement means so that said angular rate computational means are self-calibrating and self-aligning to mutually orthogonal axes, are substantially independent of variations of said electrical parameters, are substantially independent of variations of said direct axis and cross axis mechanical spring rate parameters, are substantially independent of variations of said direct axis and cross axis mechanical damping parameters, and are substantially independent of variations of said direct axis and cross axis electromechanical coupling coefficients, data validity computational means for determining validity of computed said angular rate computational means based upon computed said electrical parameters, computed said direct axis and cross axis mechanical spring rate parameters, computed said direct axis and cross axis mechanical damping parameters, and computed said direct axis and cross axis electromechanical coupling coefficients all remaining within established limits.

2. The three axis angular rate sensor of claim 1 wherein said set of mechanical spring elements comprises a set of beams, each said beam shaped as a rectangular solid.

3. The three axis angular rate sensor of claim 2 wherein said set of mechanical spring elements is made up of three pairs of said beams whose length axes are oriented along principal axes of said three axis coordinate system.

4. The three axis angular rate sensor of claim 1 wherein said measurement means comprises a multi-channel analog-to-digital voltage converter.

5. The three axis angular rate sensor of claim 1 wherein computation means comprises a digital processor programmed to compute a best fit of measured said electrical voltages and currents to expected mathematical functions of time, and, based upon said expected mathematical functions of time, to compute said angular rate, said electrical parameters, said direct axis and cross axis mechanical spring rate parameters, said direct axis and cross axis mechanical damping parameters, said direct axis and cross axis coupling coefficients of said electromechanical coupling means, time synchronization means for said frequency setting means, and time synchronization means for said measurement means data sampling.

6. A three axis angular rate sensor comprising:

a proof mass, an outer case, a set of mechanical spring elements connecting said proof mass to said outer case and having substantially equal mechanical translational spring rates along all directions, piezoelectric coupling means for relating externally connected electrical voltages and electrical currents to forces upon said set of mechanical spring elements and to translational velocities of said proof mass with respect to a three axis coordinate system fixed in said outer case, electrical excitation means for applying said electrical voltages and said electrical currents as a multiplicity of additive separate frequency sinusoidal signals with respect to time to generate translational velocities of said proof mass along each axis of said coordinate system, and to generate consequent coriolis forces upon said proof mass in response to input angular rates, frequency setting means for fixing each of said frequency sinusoidal signals within a frequency band generally near a translational mode natural mechanical resonant frequency as determined by a combination of said proof mass and said equal mechanical translational spring rates of said set of mechanical spring elements, measurement means for obtaining time periodic data samples of said electrical voltages and said electrical currents of said piezoelectric coupling means, electrical parameter computational means for determination from said measurement means electrical parameters of said piezoelectric coupling means, mechanical translational spring rate computational means for determination from said measurement means direct axis and cross axis mechanical spring rate parameters of said set of mechanical spring elements, mechanical damping computational means for determination from said measurement means direct axis and cross axis mechanical damping parameters of said set of mechanical spring elements, piezoelectric coupling computational means for determination from said measurement means direct axis and cross axis piezoelectric coupling coefficients of said piezoelectric coupling means, and angular rate computational means of said outer case with respect to said three axis coordinate system from said measurement means so that said angular rate computational means are self-calibrating and self-aligning to mutually orthogonal axes, are substantially independent of variations of said electrical parameters, are substantially independent of variations of said direct axis and cross axis mechanical spring rate parameters, are substantially independent of variations of said direct axis and cross axis mechanical damping parameters, and are substantially independent of variations of said direct axis and cross axis piezoelectric coupling coefficients, data validity computational means for determining validity of computed said angular rate computational means based upon computed said electrical parameters, computed said mechanical direct axis and cross axis translational spring rate parameters, computed said mechanical direct axis and cross axis damping parameters, and computed said direct axis and cross axis piezoelectric coupling coefficients all remaining within established limits.

7. The three axis angular rate sensor of claim 6 wherein said set of mechanical spring elements in combination with said piezoelectric coupling means comprises a set of length extensional mode piezoelectric beams, each said beam shaped as a rectangular solid.

8. The three axis angular rate sensor of claim 7 wherein said set of mechanical spring elements is made up of three pairs of said beams whose length axes are oriented along principal axes of said three axis coordinate system.

9. The three axis angular rate sensor of claim 6 wherein said measurement means comprises a multi-channel analog-to-digital voltage converter.

10. The three axis angular rate sensor of claim 6 wherein computation means comprises a digital processor programmed to compute a best fit of measured said electrical voltages and currents to expected mathematical functions of time, and, based upon said expected mathematical functions of time, to compute said angular rate, said electrical parameters, said mechanical direct axis and cross axis translational spring rate parameters, said mechanical direct axis and cross axis damping parameters, said direct axis and cross axis coupling coefficients of said piezoelectric coupling means, time synchronization means for said frequency setting means, and for said measurement means data sampling.

* * * * *